Dec. 21, 1965    H. KRATOCHVIL    3,225,343
SEQUENTIAL FLASHER
Filed May 20, 1963
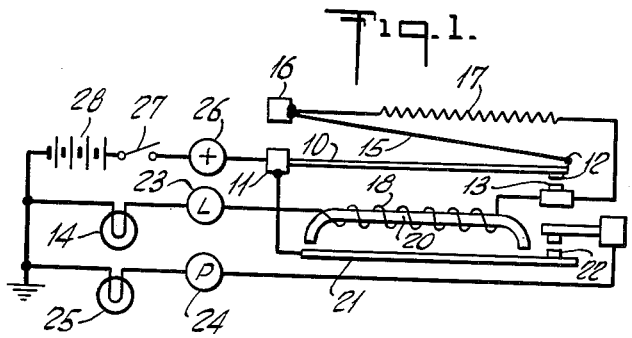
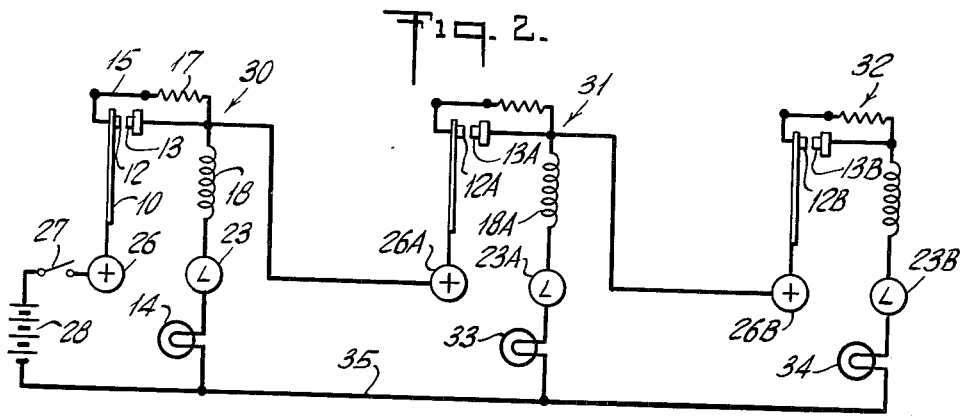
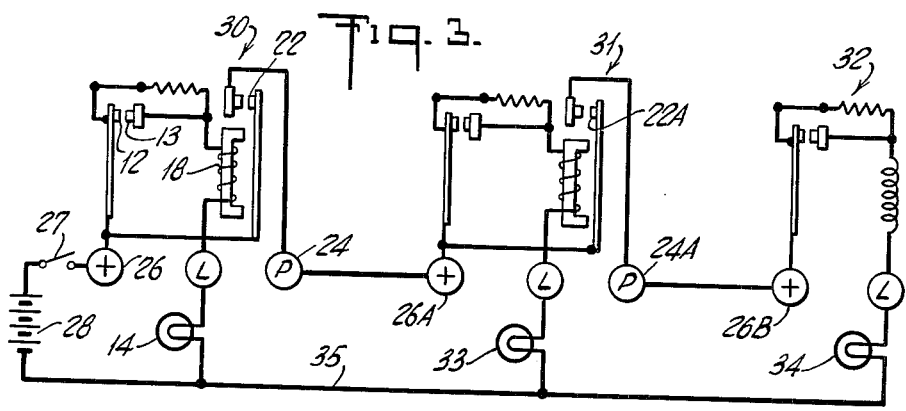
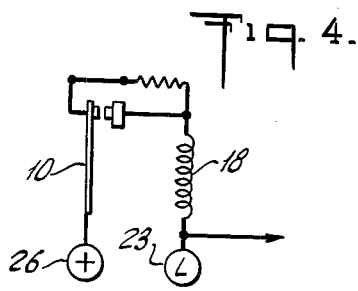
INVENTOR.
HARRY KRATOCHVIL
BY
Eyre, Mann & Lucas
ATTORNEYS United States Patent Office 3,225,343
Patented Dec. 21, 1965

3,225,343
SEQUENTIAL FLASHER
Harry Kratochvil, Fords, N.J., assignor to Tung-Sol Electric Inc., a corporation of Delaware
Filed May 20, 1963, Ser. No. 281,570
1 Claim. (Cl. 340—331)

This invention relates to a flasher control circuit which controls the currents applied to a plurality of signal lamps so that the lamps will be lighted in sequence. The invention has particular reference to a control unit for automobiles which may be used to indicate direction.

The use of directional flasher signals on automobiles and trucks is now almost universal. At the present time if more than one lamp is to be flashed, they are flashed simultaneously to indicate the direction in which an operator intends to turn. Sometimes these signals are confused with the brake lights which may be used initermittently when the brakes are applied at regular intervals. The present invention contemplates the use of several signal lamps which are controlled to light in sequence for showing the direction the car is to turn. Such a signal cannot be confused with the brake lights and since several lamps are used, the multiple illumination calls attention to the fact that a change of direction is to be made.

The invention comprises a sequential flasher control means for lighting a plurality of signal lamps in sequence. The control circuit includes a plurality of flasher units, each unit including a pair of normally open contacts with electrically operated means for opening and closing the contacts at a predetermined rate. The contacts are connected in series with a source of potential and a control switch and coupling means is provided between each of the units for lighting a lamp associated with the unit and at the same time energizing the adjacent flasher unit.

For a better understanding of the present invention, together with other and further objects thereof, reference is made to the following description taken in connection with the accompanying drawing.

FIG. 1 is a schematic diagram of connections of a flasher unit which is now in general use for controlling the flashing of a single load, which may include a pilot lamp.

FIG. 2 is a schematic diagram of connections showing three flasher control units arranged in series connection for sequentially flashing three lamps.

FIG. 3 is a schematic diagram of connections using an alternate control means for flashing the lamps.

FIG. 4 is a schematic diagram of a single flasher unit showing an alternate method of connecting the flasher units.

Referring now to FIG. 1, the flasher control unit includes a spring arm 10 secured at one end to a base portion 11 and carrying a movable contact 12 at its other end. Contact 12 cooperates with a stationary contact 13 to provide intermittent current for a signal lamp 14. The arm 10 is controlled by a pull wire 15, one end of which is secured to a base portion 16 and the other end attached under tension to the end of arm 10. A ballast resistor 17 is connected between base portion 16 and contact 13. In order to provide a pilot lamp indicator, to assure the operator that the flasher lamps are working properly, a relay unit is provided which includes a winding 18 on a core 20 and a magnetic armature 21 for operating contacts 22. One end of winding 18 is connected to the terminal post which supports contact 13 while the other end of the winding is connected to a terminal 23 and lamp 14. Contacts 22 are connected in series between support 11 and another terminal 24 and the pilot lamp 25. Terminal 11 is connected to a third terminal 26 which in turn is in series with a manually operated control switch 27 and a source of potential 28 which may be the car carried battery. The other end of the source of potential is connected to the signal lamp 14, the pilot lamp 25 and ground. This type of flasher unit is old in the art and has been described in prior publications.

Referring now to FIG. 2, three flasher units 30, 31 and 32 are shown in series connection. In this figure the relay portion of the flasher units has been omitted since it is not necessary for the operation of the lamps. It is to be understood, however, that any one of the relay portions of these flashers may be employed to furnish current to a pilot lamp placed so as to be viewed by the operator of the vehicle.

The circuit shown in FIG. 2 employs a source of potential 28, a manually operated switch 27 and terminals 26 and 23 as described above. The first lamp 14 to be lighted is connected between terminal 23 and the negative side of battery 28 as before. Arm 10, contacts 12 and 13, pull wire 15, and the ballast resistor 17, are connected as described above, there being no change in the internal wiring of the flasher unit. The operation of this unit is well known and will be described here briefly. When switch 27 is closed, current flows through the pull wire 15, ballast resistor 17, winding 18 and lamp 14. This current is insufficient to light the lamp but sufficient to heat the pull wire 15. Wire 15 thereupon expands and permits arm 10 to move to contact closing position in which pull wire 15 and resistor 17 are short-circuited, and the increased current through the lamp 14 lights that lamp. The pull wire thereupon cools and contracts, pulling the contacts apart and again sending current through the pull wire and the ballast resistor. This cycle of events normally takes about one second but by making various changes in the design the cycling rate can be increased or decreased over a wide range of interval time values.

The second flasher unit 31 has its battery terminal 26A connected to contact 13 of flasher 30. Terminal 23A of flasher 31 is connected to the second lamp 33 with the other connections to the contacts and the winding remaining the same.

The third flasher unit 32 has its terminal 26B connected to contact 13A of flasher 31 and terminal 23B connected to lamp 34. The other ends of all the lamps are connected to a common conductor 35 and the negative terminal of battery 28. Instead of connecting terminal 26A of unit 31 to contact 13, the connection may be made directly to terminal 23 as shown in FIG. 4. It should be noted that the direct current resistance of winding 18 is quite low and the current from battery 28 may go through the winding before activating the subsequent flasher unit without much reduction in voltage. It has been found that both connections work equally well.

The operation of the circuit shown in FIG. 2 is as follows: when the control switch 27 is closed, current flows from the battery through the arm 10, the pull wire 15 and resistor 17 and lamp 14. As soon as this current expands wire 15 sufficiently to permit the contacts to be closed, the full voltage of battery 28 is applied to terminal 26A and the operation of the second flasher unit 31 proceeds in exactly the same manner as the first, closing contacts 13A and lighting lamp 33. As soon as this happens, the potential of battery 28 is applied to terminal 26B and the same series of events occurs, resulting in the lighting of lamp 34. It is obvious that the first flasher unit 30 must be adjusted so that its contacts 12, 13, remain closed until contacts 12B and 13B are both closed. After a short time interval, contacts 12-13 will open and this action cuts off the current from all three units so that the lamps 14, 33, and 34 all go out together.

The circuit diagram shown in FIG. 3 uses the pilot contacts 22 to switch current to the second and third asher units. The action is the same as described above except that, when the first pair of contacts 12 and 13 are closed, current from the battery 28 flows through winding 18 and closes contacts 22, thereby sending current from the battery, through contacts 22, to the pilot terminal 24, and the battery terminal 26A of the second unit 31. The operation of the second unit is the same as the first and as soon as contacts 22A have been closed the full potential of the battery is applied to terminal 26B and the third unit 32. It is obvious that the three lamps 14, 33 and 34 will be lighted in sequence as before. As soon as the contact pair 12 and 13 is broken, relay contacts 22 will be opened, cutting off the supply of current to flashers 31 and 32 and all three lamps will be extinguished. The third relay armature in flasher unit 32 is not shown in FIG. 3 because it does not contribute to the operation which lights the three lamps in sequence. However, this relay may be used to light a pilot lamp which can be viewed by the operator of the vehicle.

From the above description it will be evident that a control circuit has been developed which will automatically light three lamps in sequence and then extinguish all three at the same time. This cycle of events continues until switch 27 is opened.

The foregoing disclosure and drawings are merely illustrative of the principles of this invention and are not to be interpreted in a limiting sense. The only limitations are to be determined from the scope of the appended claim.

I claim:

A sequential flasher control for repetitively lighting a plurality of signal lamps in sequence comprising a source of energy, a plurality of flasher units of successively higher rates, each including a pair of contacts, heat expansible pull means connected to hold said contacts open when cold and to permit closure thereof when expanded by passage of current therethrough, said contacts when closed shunting said pull means, a control switch connecting one terminal of said source to one contact of the flasher of lowest rate and to the heat expansible means thereof, means coupling one contact of the flasher of next lower rate and the heat responsive means thereof through said switch to one terminal of the source when the contacts of said flasher of lowest rate are closed, flashers of consecutively higher rate being similarly coupled, whereby one contact of the flasher of highest rate and the heat responsive means of such flasher are coupled through said switch to said one terminal of said source when the contacts of all the flashers of lower rate are closed, a plurality of signal lamps, each connected between the other terminal of the source and the other contact of a flasher so as to be lighted when the contacts of such flasher are closed, whereby when said control switch is closed, said signal lamps will successively light, then extinguish simultaneously when the heat responsive means of the flasher of lowest rate has cooled sufficiently to open the contacts of said flasher and initiate further sequential lighting of the signal lamps.

References Cited by the Examiner

UNITED STATES PATENTS

| | | | |
|---|---|---|---|
| 1,217,715 | 2/1917 | Crane | 340—342 |
| 2,056,619 | 10/1936 | Reger et al. | 340—343 |
| 2,097,313 | 10/1937 | Venzke | 340—82 |
| 2,674,730 | 4/1954 | Klebanoff et al. | 200—88.3 |
| 2,822,444 | 2/1958 | Colombo et al. | 200—88.3 |
| 3,037,102 | 5/1962 | Schmidinger | 200—88.3 |

NEIL C. READ, *Primary Examiner.*